United States Patent
Kang et al.

(10) Patent No.: US 9,652,659 B2
(45) Date of Patent: May 16, 2017

(54) MOBILE DEVICE, IMAGE REPRODUCING DEVICE AND SERVER FOR PROVIDING RELEVANT INFORMATION ABOUT IMAGE CAPTURED BY IMAGE REPRODUCING DEVICE, AND METHOD THEREOF

(71) Applicant: SAMSUNG ELECTRONICS CO., LTD., Suwon-si (KR)

(72) Inventors: Seong-min Kang, Seoul (KR); Kyung-ho Ahn, Dangjin-si (KR); Heung-woo Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/801,452

(22) Filed: Jul. 16, 2015

(65) Prior Publication Data
US 2016/0078059 A1    Mar. 17, 2016

(30) Foreign Application Priority Data
Sep. 17, 2014 (KR) .................. 10-2014-0123712

(51) Int. Cl.
*G06K 9/60* (2006.01)
*G06K 9/00* (2006.01)
*H04N 21/234* (2011.01)
*H04N 21/41* (2011.01)
(Continued)

(52) U.S. Cl.
CPC ... *G06K 9/00201* (2013.01); *G06F 17/30265* (2013.01); *H04N 21/23418* (2013.01); *H04N 21/4122* (2013.01); *H04N 21/4722* (2013.01)

(58) Field of Classification Search
CPC .............. G06Q 50/01; H04N 21/4126; H04N 21/44222; H04N 21/4431; H04N 21/482; H04N 1/00307
See application file for complete search history.

(56) References Cited

U.S. PATENT DOCUMENTS

| 7,359,894 B1 * | 4/2008 | Liebman ........... G06F 17/30867 |
| 8,407,744 B2 | 3/2013 | Moon et al. |
| 2008/0226119 A1 | 9/2008 | Candelore et al. |

(Continued)

FOREIGN PATENT DOCUMENTS

| EP | 2519023 A2 | 10/2012 |
| EP | 2696592 A1 | 2/2014 |
| KR | 10-2011-0129715 A | 12/2011 |

OTHER PUBLICATIONS

Communication issued Feb. 9, 2016, issued by the European Patent Office in counterpart European Patent Application No. 15177125.0.

*Primary Examiner* — Eueng-Nan Yeh
(74) *Attorney, Agent, or Firm* — Sughrue Mion, PLLC

(57) ABSTRACT

A method executed by a server to provide a mobile device with relevant information about an object in a captured image received from an image reproducing device, the method including: receiving, from the image reproducing device, an image captured by the image reproducing device; receiving, from the mobile device, information corresponding to an application usage history of the mobile device; searching, based on the application usage history, for the relevant information about the object in the captured image; and transmitting to the mobile device the relevant information found based on the searching.

19 Claims, 10 Drawing Sheets

(51) Int. Cl.
*H04N 21/4722* (2011.01)
*G06F 17/30* (2006.01)

(56) References Cited

U.S. PATENT DOCUMENTS

| | | |
|---|---|---|
| 2012/0331514 A1 | 12/2012 | Yeon et al. |
| 2013/0036442 A1 | 2/2013 | Wingert |
| 2013/0047178 A1 | 2/2013 | Moon et al. |
| 2013/0104172 A1* | 4/2013 | Lee ................... G06F 17/30967 725/60 |
| 2013/0212052 A1 | 8/2013 | Yu et al. |
| 2014/0223319 A1* | 8/2014 | Uchida ............. G06F 17/30277 715/739 |
| 2015/0205595 A1* | 7/2015 | Dudai ....................... G06F 8/65 717/168 |

\* cited by examiner

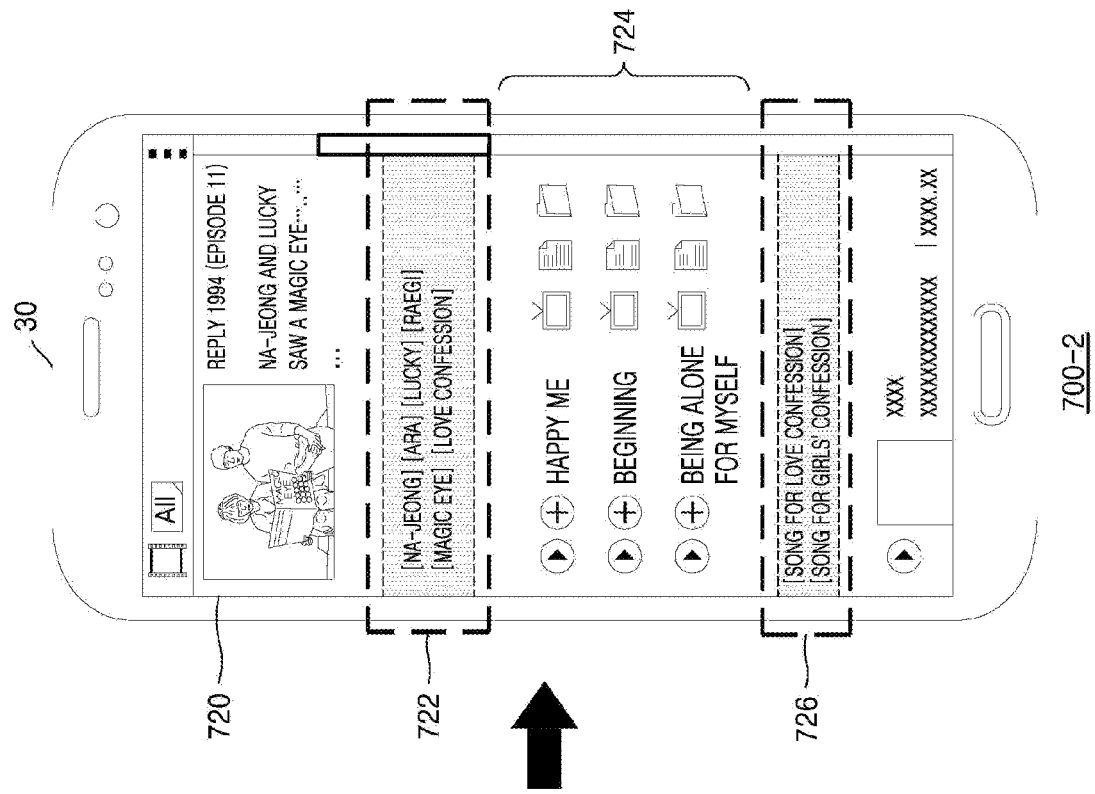
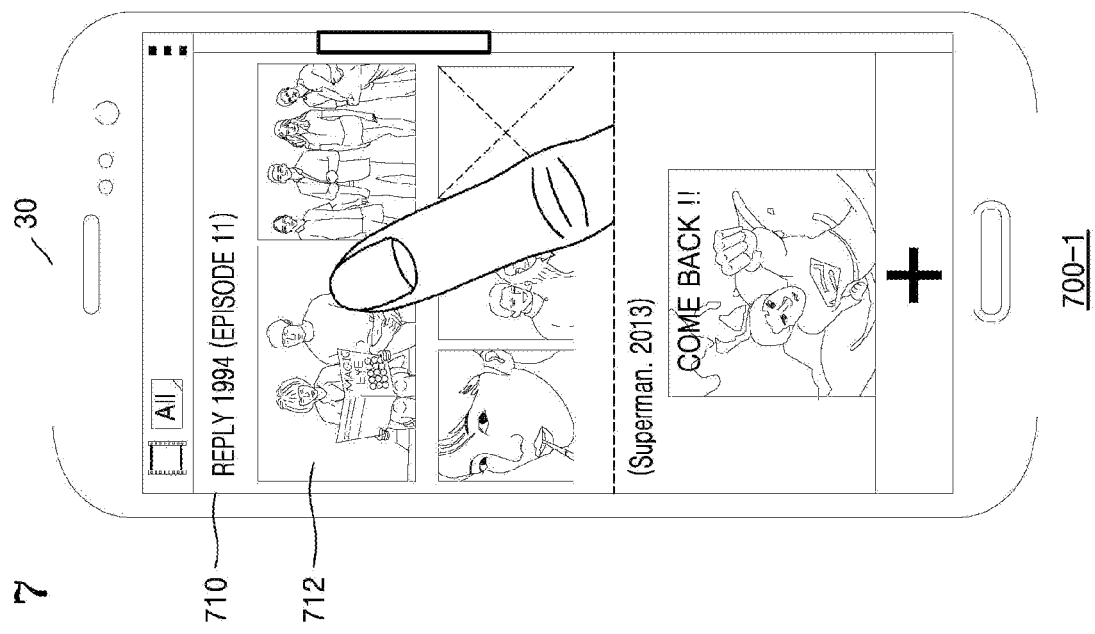
FIG. 7

MOBILE DEVICE, IMAGE REPRODUCING DEVICE AND SERVER FOR PROVIDING RELEVANT INFORMATION ABOUT IMAGE CAPTURED BY IMAGE REPRODUCING DEVICE, AND METHOD THEREOF

RELATED APPLICATION

This application claims the benefit of Korean Patent Application No. 10-2014-0123712, filed on Sep. 17, 2014, in the Korean Intellectual Property Office, the disclosure of which is incorporated herein in its entirety by reference.

BACKGROUND

1. Field

One or more exemplary embodiments relate to a method and a system for providing a mobile device with relevant information about an image captured by an image reproducing device 2. Description of the Related Art Devices, such as smart televisions (TVs), combine the functionality of TVs and computers so that they may receive and display broadcasts, as well as provide Internet services and run various applications. Relevant information about an image captured from content may be provided in an interactive manner through such devices. However, the relevant information may include information undesired by a user, and may interfere with watching TV.

To address this matter, a method of providing relevant information about content being reproduced on a TV and an image captured from images of the content and that is useful to a user has been demanded.

SUMMARY

One or more exemplary embodiments include a method and a system in which a server provides a mobile device with relevant information about an object in a captured image received from an image reproducing device.

One or more exemplary embodiments include a method and a system in which the mobile device outputs the relevant information about the object in the image captured by the image reproducing device.

According to one or more exemplary embodiments, there is provided a method executed by a server to provide a mobile device with relevant information about an object in a captured image received from an image reproducing device, the method includes: receiving, from the image reproducing device, an image captured by the image reproducing device; receiving, from the mobile device, information corresponding to an application usage history of the mobile device; searching, based on the application usage history, for the relevant information about the object in the captured image; and transmitting to the mobile device the relevant information found based on the searching.

The information corresponding to the application usage history may include use information about at least one selected from among a name of an application executed on the mobile device, information about an operation performed by the application, and information about when and where the application was executed.

The searching for the relevant information may include: obtaining a keyword corresponding to the object in the captured image; obtaining a relevant keyword corresponding to the obtained keyword; and searching for the relevant information using the obtained relevant keyword.

The searching for the relevant information using the relevant keyword may include: determining an interest category based on the information corresponding to the application usage history; and selecting an interest keyword included in the interest category from among a plurality of obtained relevant keywords.

The searching for the relevant information using the obtained relevant keyword further may include searching for the relevant information using an identifier for the interest keyword and the interest category.

The captured image is an image captured from content may be reproduced by the image reproducing device. The method may further include: receiving a content identifier from the image reproducing device; obtaining broadcast information corresponding to the content from a broadcast server that provides the content based on the content identifier; and transmitting the obtained broadcast information to the image reproducing device or the mobile device.

The method may further include: receiving, from the mobile device, an update request to update the relevant information; receiving, from the mobile device information, updated application usage history; and updating the relevant information about the object in the captured image based on the updated application usage history.

According to one or more exemplary embodiments, there is provided a method executed in a mobile device to output relevant information about an object in an image captured by an image reproducing device, the method including: receiving a user input; transmitting, to the image reproducing device and in response to the user input, an image capture request for capturing an image from content being reproduced by the image reproducing device; transmitting, to a server, information corresponding to an application usage history of the mobile device; receiving, from the server, relevant information about the object in the image captured by the image reproducing device according to the image capture request; and outputting the received relevant information.

The information corresponding to the application usage history may include use information about at least one selected from among a name of an application executed on the mobile device, information about an operation performed by the application, and information about when and where the application was executed.

The method may further include: transmitting, to the server, a relevant information update request for updated relevant information; transmitting, to the server, information corresponding to an updated application usage history of the user; and receiving, from the server, the updated relevant information updated based on the updated application usage history.

According to one or more exemplary embodiments, there is provided a non-transitory computer readable storage medium having recording thereon a program for running one or more of the above methods.

According to one or more exemplary embodiments, there is provided a server including: a transceiver configured to communicate with an image reproducing device and a mobile device; and a controller configured to control the transceiver to receive an image captured by the image reproducing device from the image reproducing device, to control the transceiver to receive information corresponding to an application usage history of the mobile device from the mobile device, to search for relevant information about an object in the captured image based on the application usage history, and to control the transceiver to transmit the relevant information to the mobile device.

The information corresponding to the application usage history may include use information corresponding to at least one selected from among a name of the application executed on the mobile device, an operation performed by the application, and information about when and where the application was executed.

The controller may be further configured to obtain a keyword corresponding to the object in the captured image, to obtain a relevant keyword corresponding to the keyword, and to search for the relevant information using the obtained relevant keyword.

The controller may be further configured to determine an interest category based on the information corresponding to the application usage history, and to select an interest keyword included in the interest category from among a plurality of obtained relevant keywords.

The controller may be further configured to search for the relevant information based on the interest keyword and the interest category.

The image captured by the image reproducing device is an image captured from content may be reproduced in the image reproducing device. The controller may be further configured to control the transceiver to receive a content identifier from the image reproducing device, to control the transceiver to obtain, from a broadcasting server that provides the content, broadcast information corresponding to the content based on the identifier for the content, and to control the transceiver to transmit, to the image reproducing device or the mobile device, the obtained broadcast information.

The controller may be further configured to control the transceiver to receive, from the mobile device, an update request to update the relevant information, to control the transceiver to receive, from the mobile device, information on an updated application usage history, and to update the relevant information based on the updated application usage history.

According to one or more exemplary embodiments, there is provided a mobile device including: an input interface configured to receive a user input; a transceiver; and a controller configured to control the transceiver to transmit, to an image reproducing device and in response to the user input, an image capture request for capturing an image from content being reproduced by the image reproducing device, to control the transceiver to transmit, to a server, information corresponding to an application usage history, and to control the transceiver to receive, from the server, relevant information about an object in the image captured by the image reproducing device according to the image capture request.

According to one or more exemplary embodiments, there is provided a mobile device including: a transceiver; and a controller configured to control the transceiver to transmit, to an image reproducing device, an image capture request to capture an image of content reproduced by the image reproducing device, to search for relevant information corresponding to the image captured according to the image capture request, and to output the relevant information.

The controller may be further configured to extract an object from the captured image, and to search for the relevant information corresponding to the extracted object.

The controller may be further configured to search for relevant information based on an application usage history of the mobile device.

The controller may be further configured to search for relevant information by: controlling the transceiver to transmit the application usage history and the captured image to a server; and controlling the transceiver to receive the relevant information from the server.

The relevant information may include information corresponding to a plurality of searches based on a plurality of relevant keywords.

According to one or more exemplary embodiments, there is provided an image reproducing device including: a display; a transceiver; and a controller configured to capture, in response to a capture image request, an image of currently displayed content, to control the transceiver to transmit the captured image and information corresponding to the content to a server, to control the transceiver to receive relevant information corresponding to the captured image, and to control the display to display the relevant information.

The controller may be further configured to control the transceiver to transmit content identification information to the server.

Additional aspects will be set forth in part in the description which follows and, in part, will be apparent from the description, or may be learned by practice of one or more exemplary embodiments.

BRIEF DESCRIPTION OF THE DRAWINGS

These and/or other aspects will become apparent and more readily appreciated from the following description of one or more exemplary embodiments, taken in conjunction with the accompanying drawings in which:

FIG. 7 illustrates views of a mobile device updating relevant information according to an exemplary embodiment;

DETAILED DESCRIPTION

Figure 1:
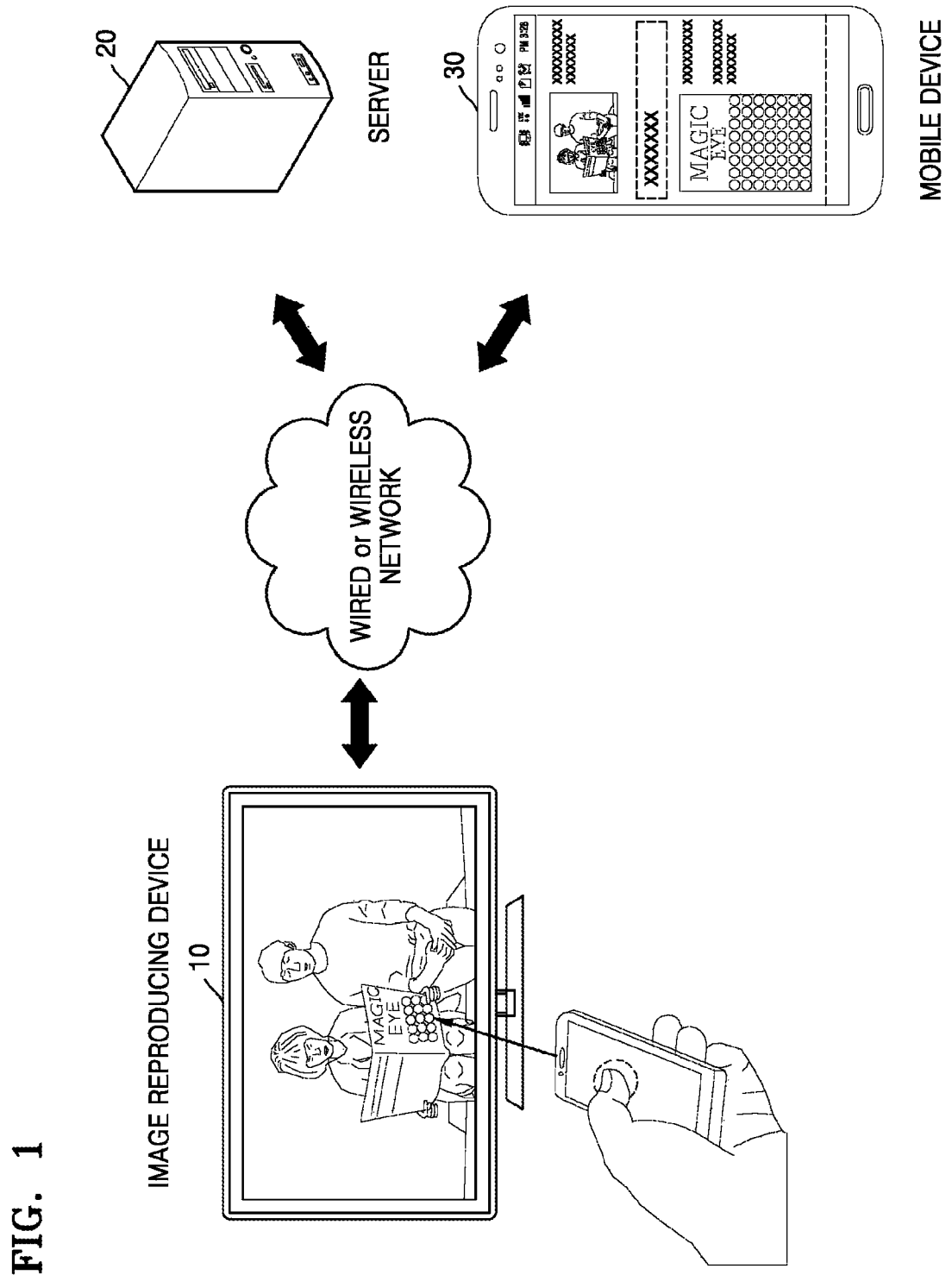
FIG. 1 is a view of a relevant information providing system according to an exemplary embodiment.

Reference will now be made in detail to one or more exemplary embodiments, examples of which are illustrated in the accompanying drawings, wherein like reference numerals refer to like elements throughout. In this regard, the one or more exemplary embodiments may have different forms and should not be construed as being limited to the descriptions set forth herein. Accordingly, the exemplary embodiments described below, by referring to the figures, are merely illustrative.

Most of the terms used herein are general terms that have been widely used in the technical art to one or more exemplary embodiments pertain. However, the terms may be different according to an understanding of one of ordinary skill in the art, a precedent, or an advent of new technology. Also, some of the terms used herein are defined in detail below. Accordingly, the specific terms used herein should be understood based on the unique meanings thereof and the whole context of the present application.

Throughout the present application, when a part "includes" an element, it is to be understood that the part may additionally include other elements rather than excluding other elements as long as there is no particular opposing recitation. Also, the terms, such as 'unit' or 'module', should be understood as a unit that processes at least one function or operation and that may be embodied as hardware, software, or a combination of hardware and the software, for instance, a general or special purpose processor and a memory containing execution instructions.

It will be understood that, although the terms first, second, etc., may be used herein to describe various elements, these elements should not be limited by these terms. These terms are only used to distinguish between elements. For example, a first element could be termed a second element, and, similarly, a second element could be termed a first element, without departing from the scope of one or more exemplary embodiments.

The term "application" refers to a series of computer program codes prepared to perform a specific job. An application may have various forms and functions. For example, the application may be a game application, a video reproduction application, a map application, a memo application, a workout helper application, a payment application, a photo folder application, or the like, but is not limited thereto.

The term "relevant information" may refer to information on another object or event that is connected to or similar to an object to be searched for.

The term "application usage history of a user" may refer to use information on applications used by a user on the mobile device. For example, the application usage history of a user may include the use information on a title of an application run on the mobile device, an operation performed by the application run on the mobile device, and the use information on when and where an application was run.

One or more exemplary embodiments will now be described more fully with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the concept of the invention to those of ordinary skill in the art. A detailed description of elements well-known in the art may be limited to improve a clarity of the present specification. Like reference numerals in the drawings denote like elements, and thus their description will not be repeated.

Hereinafter, one or more exemplary embodiments will be described in detail with reference to the accompanying drawings.

FIG. 1 is a view of a relevant information providing system according to an exemplary embodiment.

As illustrated in FIG. 1, the relevant information providing system includes an image reproducing device 10, i.e., a display apparatus, a server 20, and a mobile device 30.

In some exemplary embodiments, the image reproducing device 10 may receive broadcast content from a broadcast provider. The broadcast provider may refer to, as non-limiting examples, a general broadcasting station, a cable TV service provider, an internet TV service provider, or the like.

The image reproducing device 10 may reproduce broadcast content received from the broadcast provider, downloaded content, or streamed content.

The image reproducing device 10 may receive an image capture request for capturing an image from broadcast content being reproduced. The image capture request may be sent from a user input device included in the mobile device 30, a remote control, and the image reproducing device 10.

The image reproducing device 10 may be a TV, a hybrid broadcast broadband TV (HBBTV), a smart TV, an internet protocol TV (IPTV), and the like, but is not limited thereto. The image reproducing device 10 may also include various devices that may output content that may be reproduced, and send or receive data through a network, such as a set-top box.

In some exemplary embodiments, the server 20 may receive an image captured by the image reproducing device 10 and search for relevant information about the captured image. The relevant information may refer to information on an object or event connected, similar, or related to an object included in the captured image. Accordingly, the relevant information may refer to information that is directly and indirectly about a certain object included in the captured image. For example, if the object is a certain book, the relevant information may include content of the certain book, purchase information for the certain book, news related to the certain book, and even other books by the same author or on a similar subject.

The server 20 may receive usage history information on an application usage history of a user from the mobile device 30 in order to provide the relevant information that is useful to a user. The application usage history of a user may refer to history information on applications run on the mobile device 30 by a user. The server 20 may provide the user with the relevant information about the object included in the captured image based on the received usage history information.

In some exemplary embodiments, the mobile device 30 may output relevant search information to the server 20. The mobile device 30 may be, for example, a smart phone, a tablet phone, a cell phone, a personal digital assistant (PDA), a laptop, a media player, and a global positioning system (GPS) device, but is not limited thereto.

The mobile device 30 may receive a user input to capture an image from images of content being reproduced in the image reproducing device 10. The mobile device 30 may transmit an image capture request to the image reproducing device 10 in response to the user's input.

Also, the mobile device 30 may receive a user input requesting an update of the relevant information about the image captured by image reproducing device 10. The server 20 may receive an update request for the relevant information from the mobile device 30, and provide the mobile device 30 with updated relevant information on the captured image.

Therefore, in the relevant information providing system according to an exemplary embodiment, an image reproducing device may capture an image from images of content being reproduced in the image reproducing device. In addition, a mobile device may receive relevant information on the captured image, based on an application usage history of the mobile device. In this regard, even when two or more users capture an identical image, the relevant information providing system may provide each user with different relevant information since the users have different application usage histories.

In some exemplary embodiments, the image reproducing device 10, the server 20, and the mobile device 30 may be connected to each other through a network. The network may be embodied in a wired network such as a local area network (LAN), a wide area network (WAN), and a value added network (VAN), or a wireless network such as a mobile radio communication network, a near field communication network, and a satellite network. The network refers to a data network in which elements included in the relevant information providing system communicate with each other, and examples of the network may include a wired internet, a wireless internet, and a mobile wireless network.

Figure 2:
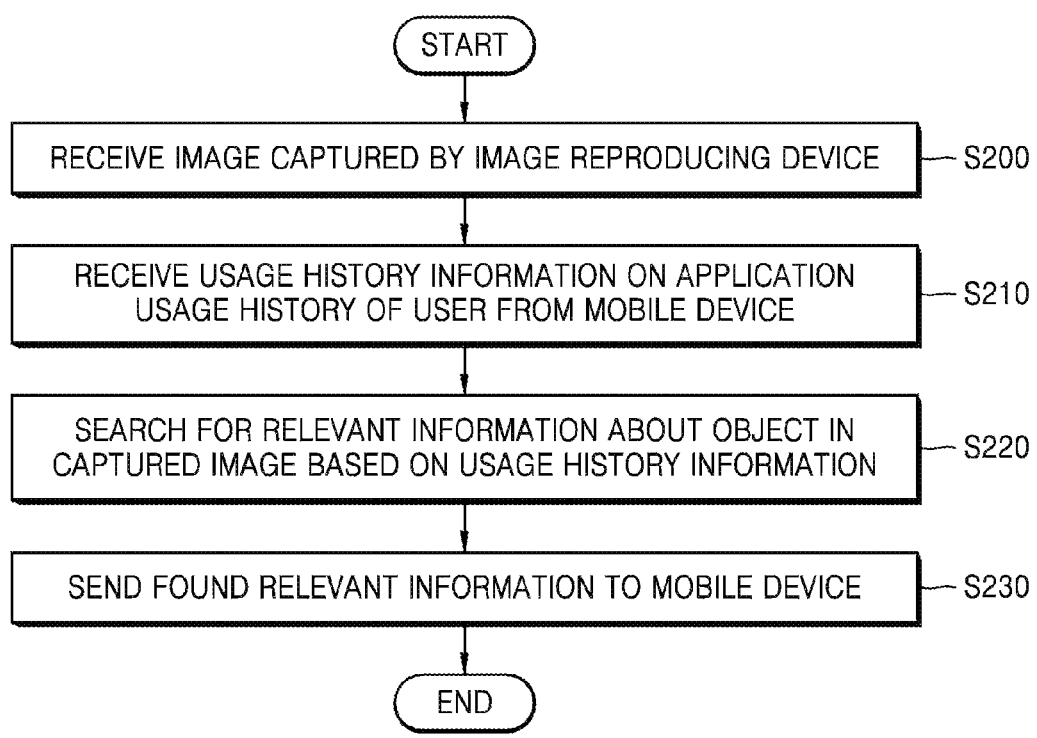
FIG. 2 is a flow chart illustrating a method of searching for relevant information in a server according to an exemplary embodiment.

FIG. 2 is a flow chart illustrating a method of searching for relevant information in a server according to an exemplary embodiment.

In Operation S200, the server 20 may receive an image captured by the image reproducing device 10 from the image reproducing device 10. Here, the captured image may come from content reproduced in the image reproducing device 10.

The server 20 may receive meta data on the captured image. The meta data may include, for example, time information on when the image was captured by the image reproducing device 10, broadcast channel information of the content corresponding to the captured image, identifier information of the content corresponding to the captured image, and keyword information about an object in the captured image. However, the meta data is not limited thereto. The server 20 may receive only a content identifier included in the meta data.

The server 20 may receive both the image captured by the image reproducing device 10 and the meta data on the captured image, but is not limited thereto. The server 20 may receive only the meta data on the captured image.

In operation S210, the server 20 may receive usage history information on an application usage history of a user from the mobile device 30. The application usage history of a user may include, for example, a title of an application run on the mobile device 30, an operation performed by the application, and information on when and where the application was run. As a non-limiting example, the server 20 may receive information on the application usage history including the name and time information on applications executed on the mobile device 30 over the past week.

The usage history information may be stored in the mobile device 30, in the server 20, or in an external database. When a user uses the application on the mobile device 30 or when a certain operation of the application that is used by a user is performed, the mobile device 30 may transmit information on the name or the operation of the application being used to the server 20 or to the external database.

Accordingly, the server 20 may receive the information on the application usage history of a user directly from the mobile device 30 or from the external database. When the usage history information is stored in the server 20, the server 20 may refer to the application usage history stored in the server 20.

In operation S220, the server 20 may search for relevant information about an object in the image captured by the image reproducing device 10, based on the application usage history of a user.

In some exemplary embodiments, the server 20 may obtain one or more relevant keywords about an object in an image captured by the image reproducing device 10. In this case, the relevant keyword may refer to a keyword that is connected to the object in the captured image. The relevant keyword may include a word combined with the keyword about the object, or a word about an event related to the object. As a non-limiting example, if the object in the captured image is connected to 'magic eye', the relevant keyword may include 'magic eye' and the combination word 'magic eye principle' in which 'magic eye' and 'principle' are combined. The relevant keyword may also include 'three-dimensional (3D) picture' generated from information that the 'magic eye' refers to when a 3D picture or a 3D photo is seen by the naked eye.

The server 20 may select an interest keyword from among the relevant keywords, based on the information on the received application usage history user. The interest keyword may be a keyword included in a user's interest category that is determined by the application usage history of a user, from among the relevant keywords. Here, the interest category may be identified with, for example, movies, shopping, travel, books, music, social networks, or the like, and may have an identifier corresponding to each category. In detail, for example, when an e-book application is the most frequently executed application on the mobile device 30, the server 20 may determine 'books' as the interest category. In this case, the server 20 may select the interest keyword about the 'books' from among relevant keywords.

The server 20 may also receive the interest keyword from the mobile device 30. In some exemplary embodiments, the server 20 may search for relevant information by using the interest keyword and the identifier for the interest category. A method by which the server 20 searches for the relevant information about the captured image will be explained in detail in FIG. 3.

In operation S230, the server 20 may transmit the found relevant information to the mobile device 30. The mobile device 30 may output all or part of the relevant information received from the server 20. Alternatively, the server 20 may transmit the found relevant information to the image reproducing device 10, and image reproducing device 10 may output all or part of the relevant information received from the server 20.

Figure 3:
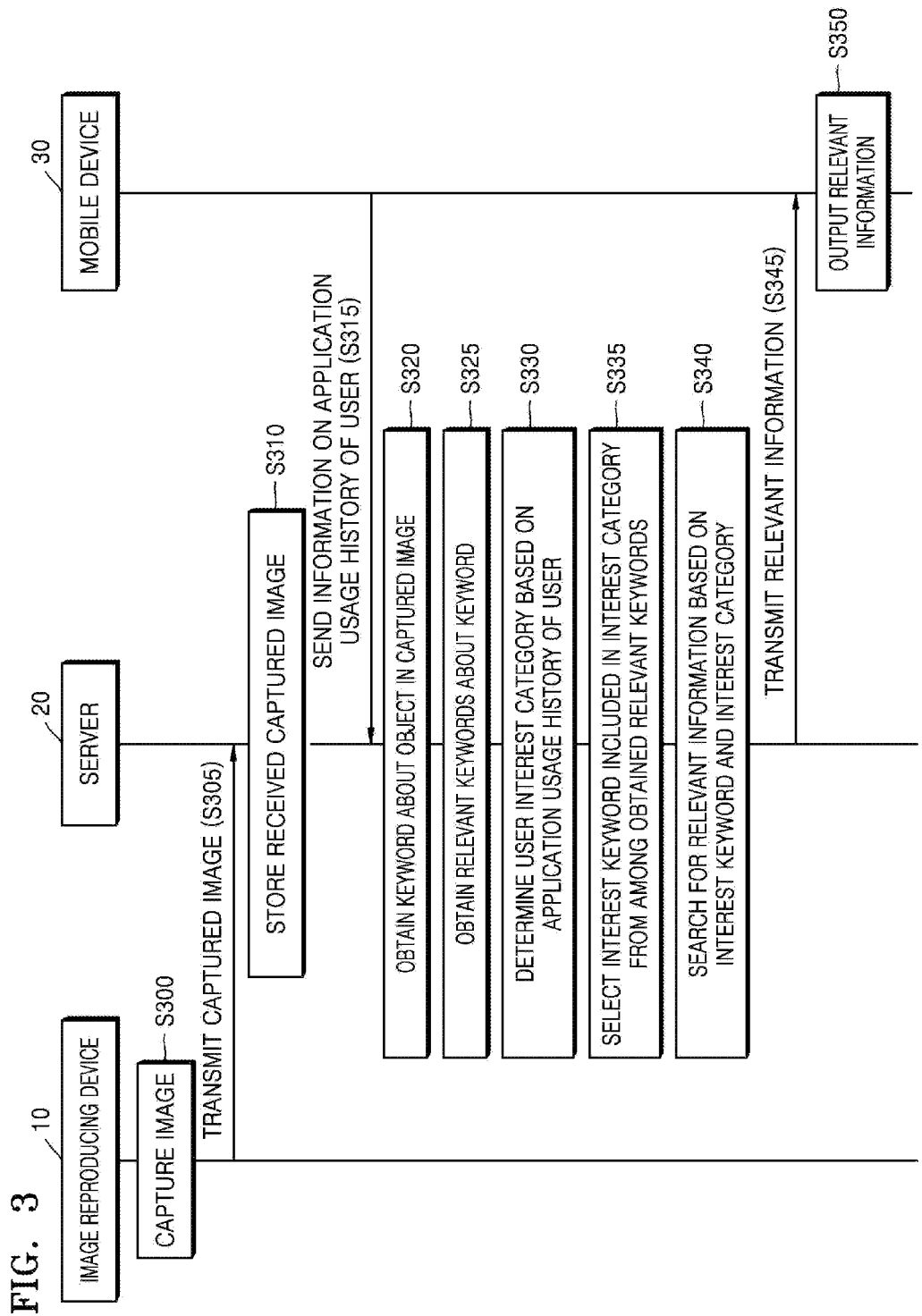
FIG. 3 is a sequence diagram illustrating a method of searching for the relevant information about the image captured by the image reproducing device according to an exemplary embodiment.

FIG. 3 is a sequence diagram illustrating a method of searching for the relevant information about the image captured according to an exemplary embodiment.

In operation S300, the image reproducing device 10 may capture an image from images of content being reproduced. Here, the content being reproduced in the image reproducing device 10 may include content such as a show, a movie, and an advertisement that are received from a broadcast provider, but is not limited thereto.

In some exemplary embodiments, the image reproducing device 10 may receive an image capture request from the mobile device 30 to capture an image from images of content being reproduced. The mobile device 30 may provide a user interface for capturing the image from the images of the content being reproduced in the image reproducing device 10. The mobile device 30 may transmit the image capture request to the image reproducing device 10 according to a user input received through the user interface.

Also, the image reproducing device 10 may receive the image capture request through a user input device included in the image reproducing device 10. The user input device may include, for example, a touch screen, a physical button, a remote control, or the like. For example, the image reproducing device 10 may capture the image from the images of the content being reproduced in response to a user input received through a remote control.

In some exemplary embodiments, the image reproducing device 10 may capture an image from images of content being reproduced in the image reproducing device 10 in response to a received image capture request. The image reproducing device 10 may capture an image output on all or part of a screen of the image reproducing device 10 in response to the received image capture request. For example, when the image reproducing device 10 receives the image capture request while reproducing a show, the image reproducing device 10 may capture a certain scene of the show output on the screen of the image reproducing device 10. However, one or more exemplary embodiments are not limited thereto.

The captured image may be stored as raw data, or may be stored after being converted to a predetermined format. For example, the captured image may be converted into an image format such as bitmap, joint photographic experts group (JPEG), graphics interchange format (GIF), or portable network graphics (PNG).

In some exemplary embodiments, the image reproducing device 10 may inform a user that an image is captured from images of content being reproduced in the image reproducing device 10. For example, the image reproducing device 10 may display an alert message on a part of a screen. Also, the image reproducing device 10 may display the captured image on a part of a screen.

In operation S305, the image reproducing device 10 may transmit the captured image to the server 20. The captured image may be transmitted to the server 20 as raw data or in the predetermined image format.

In some exemplary embodiments, the image reproducing device 10 may transmit meta data on the captured image to the server 20. The meta data may include, as described with reference to FIG. 2 above, a content identifier for the captured image. The server 20 may identify content corresponding to the captured image by using the content identifier. In addition, the server 20 may obtain broadcast information on the identified content from a broadcast provider. In this case, the broadcast information on the content may include, for example, a title or a type of the content, broadcast time information, cast information of the content, character information of the content, and may further include a plot of the content and a description for each scene included in the content.

The image reproducing device 10 may record sound of the content being reproduced that corresponds to the captured image and transmit the recorded sound to the server 20. The server 20 may identify the broadcast content based on the received sound. Moreover, the server 20 may obtain the broadcast information about the identified broadcast content from a broadcast provider.

In operation S310, the server 20 may store the image captured by the image reproducing device 10. Also, the server 20 may store the meta data on the received captured image. The server 20 may store the image identifier corresponding to the captured image, but is not limited thereto.

The captured image and the meta data that are stored may be used to update the relevant information on the stored captured image. A method of updating the relevant information about the stored captured image will be explained later with reference to FIG. 6.

In some exemplary embodiments, the server 20 may store at least one of the received captured image and the meta data on the received captured image in an external database.

In operation S315, the mobile device 30 may transmit the usage history information on an application usage history of a user to the server 20.

In some exemplary embodiments, the mobile device 30 may store application usage information periodically or whenever a user runs a certain application. The application usage information may include, for example, a name of an application run on the mobile device 30, an operation performed by the application, and information on when and where the application was run. The application usage history of a user may refer to application usage information accumulated over a predetermined period. Also, the mobile device 30 may store the application usage information of a user in an external database.

In some exemplary embodiments, the mobile device 30 may transmit the usage history information to the server 20 in response to a user input for capturing an image of content being reproduced in the image reproducing device 10.

The mobile device 30 may transmit the usage history information to the server 20 when the server 20 requests the application usage history of a user.

Also, the mobile device 30 may analyze the application usage history of a user and transmit an analysis result to the server 20. For example, the mobile device 30 may transmit a list of application names arranged in a frequency order, starting from the most frequently executed application over a predetermined period.

Although the foregoing describes that the mobile device 30 transmits the usage history information on the application usage history of a user to the server 20, one or more exemplary embodiments are not limited thereto, and an external database may transmit the usage history information on the application usage history of a user to the server 20.

In operation S320, the server 20 may obtain a keyword about an object in the image captured by the image reproducing device 10.

In some exemplary embodiments, the server 20 may extract an object from the captured image. Here, the object may include a person, a thing (e.g., a book or a chair), and a structure (e.g., play equipment) in the image captured from the content being reproduced in the image reproducing device 10.

The server 20 may extract the object included in the captured image by using an object recognition algorithm. The object recognition algorithm may be embodied, for example, by the use of open computer vision (OpenCV), a facial recognition system, a speaker recognition system, facial recognition technology (FERET), and an active appearance model (AAM), but is not limited thereto. Also, the server 20 may extract the object in the image by using the meta data on the captured image.

Also, the server 20 may select some objects from among a plurality of extracted objects based on the application usage history of a user. For example, the server 20 may select some objects from among the extracted objects based on search formula history information, which is input by a user, on the mobile device 30.

In some exemplary embodiments, the server 20 may obtain a keyword about the extracted object. The server 20 may identify content corresponding to the captured image and receive broadcast information on the identified content from a broadcast provider or the image reproducing device 10. The server 20 may obtain the keyword about the extracted object based on the broadcast information on the content. For example, the server 20 may use character information (e.g., the keyword 'Na-Jeong' that represents a character A) and cast information (e.g., the keyword 'ARA' that represents an actor who plays the character A) from among the broadcast information on the content, in order to obtain a keyword about the character A that is extracted from the captured image.

In operation S325, the server 20 may obtain a relevant keyword about the keyword about the object in the captured image.

In some exemplary embodiments, the server 20 may obtain a relevant keyword by using the broadcast information on the content corresponding to the captured image. For example, the server 20 may obtain the relevant keyword based on a plot of the content corresponding to the captured image. The server 20 may obtain the relevant keyword for 'magic eye' and 'love confession' by using the plot of the content, which is, "Lucky confesses his love to Na-Jeong through the magic eye".

Also, the server 20 may obtain the relevant keyword by using a knowledge graph, semantic similarity, or ontology. Here, the ontology may refer to formally specify a relationship between terms in a particular field.

The server 20 may obtain the relevant keyword by using a search server, but is not limited thereto.

In operation S330, the server 20 may determine a user interest category based on the application usage history of a user.

In some exemplary embodiments, the server 20 may analyze the application usage history of a user received from the mobile device 30 to get information on the most frequently executed application over a predetermined period, the most frequently executed application when the content corresponding to the captured image is broadcast, the most frequently executed application in a place where the image reproducing device 10 is located, or the like. The server 20 may determine the interest category based on an analysis result.

Although the foregoing describes that the server 20 analyses the application usage history of a user to determine the interest category, one or more exemplary embodiments are not limited thereto. The server 20 may receive the interest category from the mobile device 30.

In operation S335, the server 20 may select an interest keyword that is included in the interest category from among the obtained relevant keywords.

In some exemplary embodiments, the serve 20 may select an interest keyword by using a basic keyword set classified according to the identified category. For example, the server 20 may select the interest keyword based on a similarity between the obtained relevant keyword and the basic keyword set corresponding to an identifier for the interest category.

Also, the server 20 may select the interest keyword matching to the selected category by using a matching algorithm that matches the identified category to the obtained relevant keyword, but is not limited thereto.

In some exemplary embodiments, the server 20 may obtain relevant keywords about the selected interest keyword. Also, the server 20 may select the interest keyword included in the interest category from among the obtained relevant keywords, and then obtain the relevant keyword about the selected interest keyword. In this regard, the server 20 repeatedly obtains the relevant keyword, and thus extends the relevant keyword about the captured image.

In operation S340, the server 20 may search for the relevant information by using the interest keyword and the identifier for the interest category. Here, the relevant information may refer to information about the object. For example, the relevant information may include information on a content (e.g., a book, a movie, a show) related to the object, purchase information of the object, or the like. Also, if the object is a person, the relevant information may include information on content in which the person starred, information on a book the person wrote, or the like.

In some exemplary embodiments, the server 20 may provide a user with the relevant information included in the interest category from among the relevant information searched for by using the interest keyword. For example, the relevant information for searched by using the interest keyword of the magic eye may include information about a book with a title (or sub-title) of the magic eye, information about a movie with a theme of the magic eye, and information on the origin of the magic eye or the principle of the magic eye. The server 20 may provide a user with relevant information on 'magic eye book information' (e.g., summary and purchase information of books having 'magic eye' in their title, etc.) that is included in the identifier for the interest category from among the found relevant information.

Also, the server 20 may provide a user with the relevant information searched for by using a search formula in which the interest keyword and the identifier for the interest category are combined. For example, the server 20 may search for the relevant information by using the search formula (e.g., magic eye book) in which the interest keyword (e.g., magic eye) and the identifier for the interest category (e.g., book) are combined.

In some exemplary embodiments, the server 20 may search for relevant information by using a search engine and the search engine may be positioned at an internal or external search server or the server 20. For example, the server 20 may use a keyword search engine including an index database, and a meta search engine using a plurality of search engines.

In operation S345, the server 20 may transmit the found relevant information to the mobile device 30. In addition, the server 20 may transmit the obtained relevant keyword to the mobile device 30.

In operation S350, the mobile device 30 may output the received relevant information. A method by which the mobile device 30 outputs the relevant information may vary depending on a user setting for the mobile device 30 or an embodiment of an application that is run on the mobile device 30 and outputs the relevant information. For example, the mobile device 30 may output all of the received relevant information or may preferentially output certain information from among the received relevant information. Examples of the relevant information output from the mobile device 30 will be described with reference to FIG. 4.

As described above, the relevant information providing system according to an exemplary embodiment may effectively provide a user with the relevant information about the object included in the image captured by the image reproducing device while demanding minimal user input. Also, the relevant information providing system according to an exemplary embodiment provides a user with the relevant information through a mobile device that is easily used by the user, thereby improving user convenience.

Figure 4:
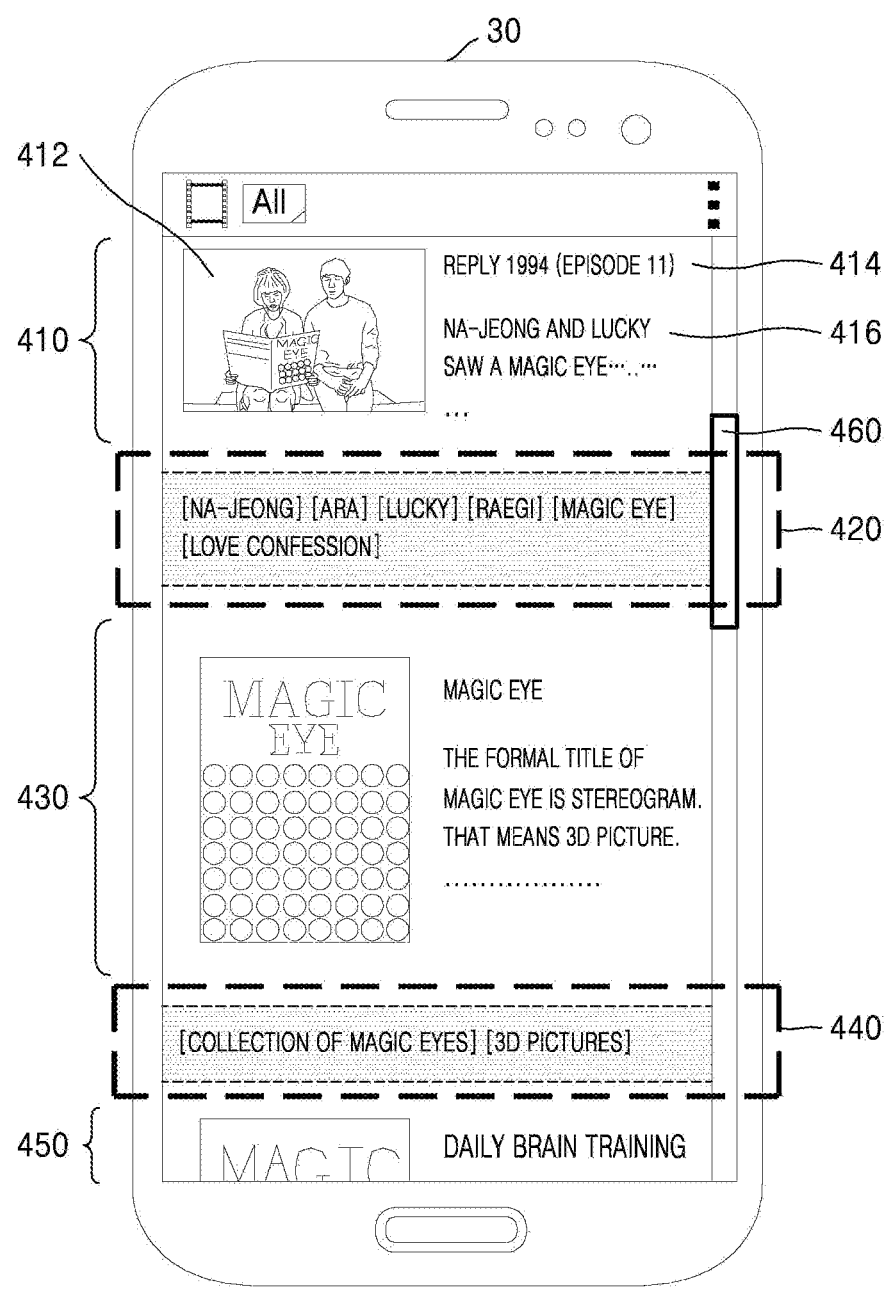
FIG. 4 illustrates a sequence diagram of a mobile device outputting the relevant information according to an exemplary embodiment.

FIG. 4 shows an example of a mobile device outputting the relevant information.

Referring to FIG. 4, the mobile device 30 may output summary information 410 on the image captured by the image reproducing device 10, a first relevant keyword 420, first relevant information 430, a second relevant keyword 440, and second relevant information 450.

In some exemplary embodiments, the mobile device 30 may receive broadcast information on content corresponding to an image captured by the image reproducing device from the server 20.

The mobile device 30 may output summary information 410 that corresponds to the captured image by using the broadcast information on the received content. The summary information 410 on the captured image may include an image 412 captured by the image reproducing device 10, a title of the content corresponding to the captured image, time information 414 on when the image was captured by the image reproducing device, a plot 416 of the content corresponding to the captured image, and the like.

The mobile device 30 may receive the first relevant keyword 420, the first relevant information 430, the second relevant keyword 440, and the second relevant information 450 from the server 20.

The server 20 may extract an object in the image captured by the image reproducing device 10, and obtain the first relevant keyword 420 (e.g., Na-Jeong, magic eye, etc.) about the extracted object. Also, the server 20 may determine an interest category (e.g., a book) based on the application usage history of a user received from the mobile device 30. The server 20 may select the first interest keyword (e.g., magic eye) included in the interest category from among the obtained first relevant keywords 420 (e.g., Na-Jeong, magic eye, etc.).

The server 20 may also obtain the second relevant keyword 440 (e.g., magic eye collection, etc.) about the selected first interest keyword. The server 20 may select the second interest keyword (e.g., magic eye collection) included in the interest category (e.g., book) from among the obtained second relevant keywords 440 (e.g., magic eye collection, 3D picture).

In addition, the server 20 may obtain a third relevant keyword and a third interest keyword based on the second interest keyword.

The server 20 may search for the first relevant information 430 by using the first interest keyword (e.g., magic eye) and the identifier (e.g., book) of the interest category. For example, the first relevant information 430 may include content and purchase information of a book which title is 'magic eye'. Also, the server 20 may search for the second relevant information 450 by using the second interest keyword (e.g., magic eye collection) and the identifier (e.g., book) of the interest category. For example, the second relevant information may include content and purchase information of a book that has 'magic eye collection' as its sub-title.

In some exemplary embodiments, the mobile device 30 may sequentially output the received first relevant keyword 420, first relevant information 430, second relevant keyword 440, and second relevant information 450.

The mobile device 30 may receive a user input selecting a keyword from the first relevant keyword 420 and the second relevant keyword 440. For example, a user may select the keyword (e.g., love confession) by touching an area of the mobile device 30 where the selected keyword is output. The mobile device 30 may request an update of the relevant information about the captured image to the server 20 by using the selected keyword selected by the user as the interest keyword. The mobile device 30 may receive the updated relevant information from the server 20, and update at least one selected from the first relevant information 430, the second relevant keyword 440, and the second relevant information 450.

Figure 5:
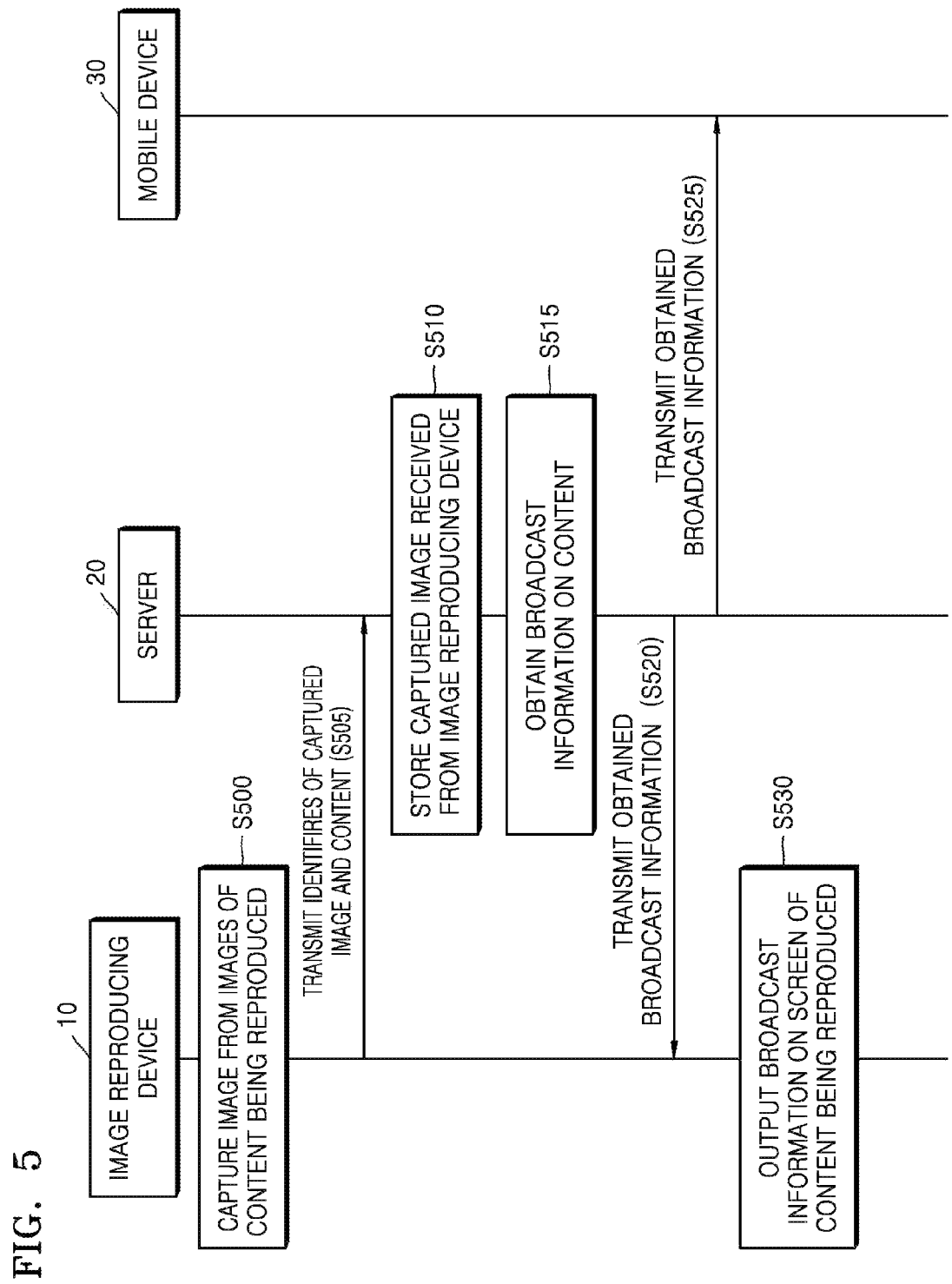
FIG. 5 is a sequence diagram showing how to obtain the broadcast information on the content corresponding to the image captured by image reproducing device according to an exemplary embodiment.

FIG. 5 is a sequence diagram showing how to obtain the broadcast information on the content corresponding to the image captured by the image reproducing device according to an exemplary embodiment.

In operation S500, the image reproducing device 10 may capture the image from the images of the content being reproduced in the image reproducing device 10. Operation S500 may be similar to operation S300 in FIG. 3, and thus detailed descriptions thereof will not be repeated.

In operation S505, the image reproducing device 10 may transmit the content identifier corresponding to the captured image along with the image captured by the image reproducing device 10 to the server 20. The content identifier may be information for identifying the content from among contents that the broadcast provider or the external database provides. The image reproducing device 10 may transmit the meta data on the captured image including the content identifier to the server 20.

In operation S510, the server 20 may store the received captured image. Operation S510 may be similar to operation S310 in FIG. 3, and thus detailed descriptions thereof will not be repeated.

In operation S515, the server 20 may obtain the broadcast information on the content corresponding to the captured image from a broadcast server. Here, the broadcast server may refer to a server operated by the broadcast provider that provides the image reproducing device 10 with the content, or an external server that manages the broadcast information on the content. The server 20 may obtain the broadcast information on the content corresponding to the captured image from the broadcast server by using the received content identifier. Also, the server 20 may obtain the broadcast information on the content by using a search engine.

The broadcast information on the content may include a title and type of the content, broadcast time information, cast information, and character information of the content, as well as a plot of the content and a description for each scene of the content.

The server 20 is described above as obtaining the broadcast information on the content corresponding to the captured image from the broadcast server, but is not limited thereto. The image reproducing device 10 may obtain the broadcast information from the broadcast server. In this case, image reproducing device 10 may transmit the obtained broadcast information to the server 20.

In operations S520 and S525, the server 20 may transmit the broadcast information on the searched content to the image reproducing device 10 and the mobile device 30.

In operation S530, the image reproducing device 10 may output the broadcast information on the received content on all or a part of the screen where the content is reproduced by the image reproducing device 10.

Figure 6:
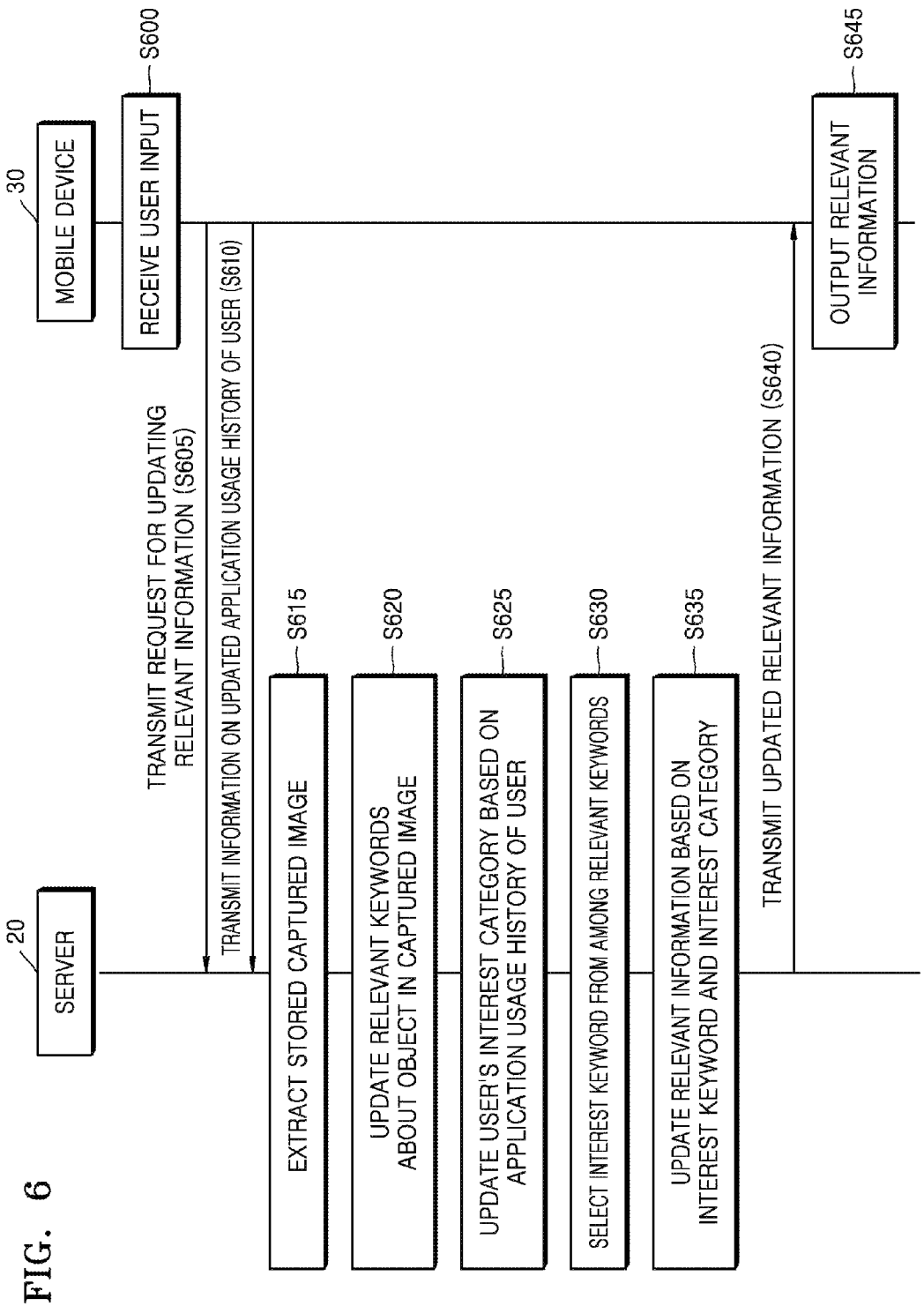
FIG. 6 is a sequence diagram showing how to update the relevant information according to an exemplary embodiment.

FIG. 6 is a sequence diagram showing how to update the relevant information in the relevant information providing system according to an exemplary embodiment.

In operation S600, the mobile device 30 may receive the user input for requesting an update of the relevant information about the image captured by the image reproducing device.

In some exemplary embodiments, the mobile device 30 may provide a user with a captured image list including a plurality of captured images that are captured by at least one image reproducing device. The mobile device 30 may receive the user input requesting an update of the relevant information about a captured image on the captured image list. For example, the user may touch the screen corresponding to one captured image where the captured image list including a plurality of captured images is output.

Also, the mobile device 30 may receive the user input requesting an update of the relevant information about the selected keyword on the screen where the relevant keyword and relevant information about the captured image are output. For example, the user may touch the screen corresponding to one relevant keyword from among a plurality of the relevant keywords output on the screen. For example, referring to FIG. 4, the mobile device 30 may receive the user input that touches the area where '[love confession]' is output from among the first relevant keywords 420 output on the screen is output.

In operation S605, the mobile device 30 may transmit an update request for updating the relevant information about the selected captured image or selected keyword to the server 20 in response to the user input. The mobile device 30 may also transmit an identifier for the selected captured image.

In operation S610, the mobile device 30 may transmit the information on the application usage history to the server 20. The information on the application usage history may include information on a name of an application run on the mobile device 30, an operation performed by the application, and when and where the application was run. Operation S610 may be similar to operation S315 in FIG. 3, and thus a detailed description thereof will not be repeated.

In some exemplary embodiments, the mobile device 30 may analyze an application usage history of a user and then store an analysis result thereof. The mobile device 30 may analyze an application usage history of a user and compare an analysis result with the stored analysis result in response to an update request of the relevant information about the selected captured image or keyword. In this case, if the analysis result is the same as the stored analysis result, the mobile device 30 may not transmit the analysis result to the server 20.

In operation S615, the server 20 may extract the stored captured image using the identifier for the captured image received from the mobile device 30.

In operation S620, the server 20 may update the relevant keyword by obtaining the relevant keyword about the object included in the captured image. The method used by the server 20 to obtain the relevant keyword about the object included in the captured image may be similar to operations S320 and S325 in FIG. 3, and thus a detailed description thereof will not be repeated.

In operation S625, the server 20 may receive the usage history information about the updated application usage history from the mobile device 30 and then update the user's interest category. The server 20 may analyze the updated usage history information to get information on the most frequently executed application over a predetermined period, the most frequently executed application when the content corresponding to the captured image is broadcast, and the most frequently executed application in a place where the image reproducing device 10 is located, or the like. The server 20 may update the interest category based on the analysis result.

In operation S630, the server 20 may select the interest keyword included in the interest category from among the obtained relevant keywords. The method used by the server 20 to select the interest keyword may be similar to that of operation S335 in FIG. 3, and thus a detailed description will not be repeated.

In operation S635, the server 20 may update the relevant information by using the interest keyword and the identifier for the interest category. The server 20 may search the relevant information through a search engine. The updated relevant information may be transmitted to the mobile device 30 in operation S640.

In operation S645, the mobile device 30 may output the updated relevant information.

In some exemplary embodiments, as an application usage history of a user of a mobile device is updated, relevant information updated by a user input may be different from previously-searched relevant information. Also, the updated relevant information may reflect information accumulated as time passes after searching the previously-searched relevant information. In this regard, the updated relevant information may include more information than the previously-searched relevant information.

FIG. 7 shows an example of updating relevant information in the relevant information providing system according to an exemplary embodiment. 700-1 illustrates how a user requests an update of relevant information about an image 712 captured by the image reproducing device in FIG. 4, and 700-2 illustrates mobile device 30 outputting updated relevant information according to a user's input.

Referring to 700-1, the mobile device 30 may provide a captured image list 710 including a plurality of captured images captured by at least one image reproducing device. The captured image list 710 may include the plurality of captured images and titles corresponding to the captured images. The captured image list 710 may also present the relevant keyword corresponding to each of the captured images, but is not limited thereto.

The mobile device 30 may receive a user input for requesting an update of relevant information about a selected captured image in the captured image list 710. The user input may be received by touching a screen corresponding to one of the captured images. For example, the user may touch a part of the screen that corresponds to the image 712 captured by the image reproducing device in FIG. 4.

The mobile device 30 may request an update of the relevant information about the captured image 712 in response to the user touch input. Also, the mobile device 30 may transmit an identifier for the image 712 captured by the image reproducing device in FIG. 4 to the server 20.

The server 20 may extract the captured image 712 stored in the server 20 or an external database, meta data on the stored captured image 712, or the like from the server 20 or the external database by using the identifier for the image 712 captured by the image reproducing device in FIG. 4, which is received from the mobile device 30.

Also, the server 20 may update a first relevant keyword 722 about an object in the extracted image. The updated first relevant keyword 722 may be different from the relevant keyword in FIG. 4, but is illustrated as identical.

The server 20 may receive usage history information on an updated application usage history from the mobile device 30. The server 20 may update an interest category based on the updated usage history information. For example, a user may use a 'music play application' more than an 'e-book application' at the time when requesting the update of the relevant information. Here, the updated interest category may be 'music'.

The server 20 may select a first interest keyword (e.g., love confession) included in the updated interest category from among the first relevant keywords 722. The server 20 may search for first relevant information 724 by using identifiers for the selected first interest keyword (e.g., love confession) and the updated interest category (e.g., music). Also, the server 20 may update a second relevant keyword 726 about the first interest keyword (e.g., love confession).

The mobile device 30 may receive the updated relevant information including the updated first relevant keyword 722, the updated first relevant information 724, the updated second relevant keyword 726, or the like from the server 20 and output the same (700-2).

Figure 8:
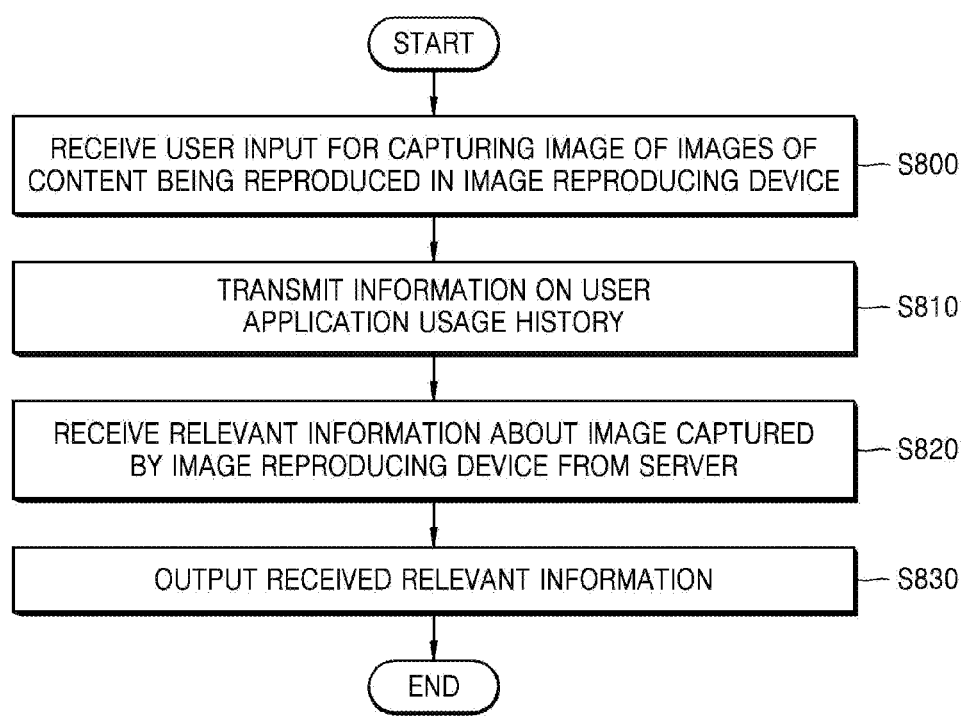
FIG. 8 is a flow chart illustrating a method of the mobile device outputting the relevant information about the captured image according to an exemplary embodiment.

FIG. 8 is a flow chart illustrating a method used by the mobile device according to an exemplary embodiment to output the relevant information.

In operation S800, the mobile device 30 may receive a user input for capturing an image of content being reproduced in the image reproducing device 10.

In some exemplary embodiments, the mobile device 30 may provide a user interface for inputting a request to capture an image of content being reproduced in at least one image reproducing device. For example, the mobile device 30 may receive a user input on a screen that outputs the captured image list 710 in FIG. 7. The mobile device 30 may also provide the user interface on a locked screen of the mobile device 30, but is not limited thereto.

The mobile device 30 may communicate with the image reproducing device 10 through a near field network. The mobile device 30 may be automatically or manually paired to communicate with the image reproducing device 10.

In operation S810, the mobile device 30 may transmit usage history information about an application usage history to the server 20. The information on the application usage history may include information on a title of an application run in the mobile device 30, an operation implemented by the application, and when and where the application was run.

Also, the mobile device 30 may analyze the application usage history of a user and transmit an analysis result thereof to the server 20. For example, the mobile device 30 may transmit an application name list that shows the most frequently executed applications over a predetermined time period in a descending order to the server 20.

In some exemplary embodiments, the mobile device 30 may transmit usage history information to the server in response to a user input for capturing an image of content being reproduced in the image reproducing device 10.

Also, the mobile device 30 may transmit the usage history information to the server when the server 20 requests the usage history information from the mobile device 30.

In operation S820, the mobile device 30 may receive the relevant information about the image captured by the image reproducing device 10 from the server 20. The mobile device 30 may also receive the relevant keyword about the image captured from the image reproducing device 10.

In operation S830, the mobile device 30 may output the received relevant information. A method used by the mobile device 30 to output the received relevant information may vary depending on a user setting or an embodiment of a relevant information providing application executed on the mobile device 30. For example, the mobile device 30 may output all of the received relevant information, or may output only a part of the received relevant information.

Figure 9:
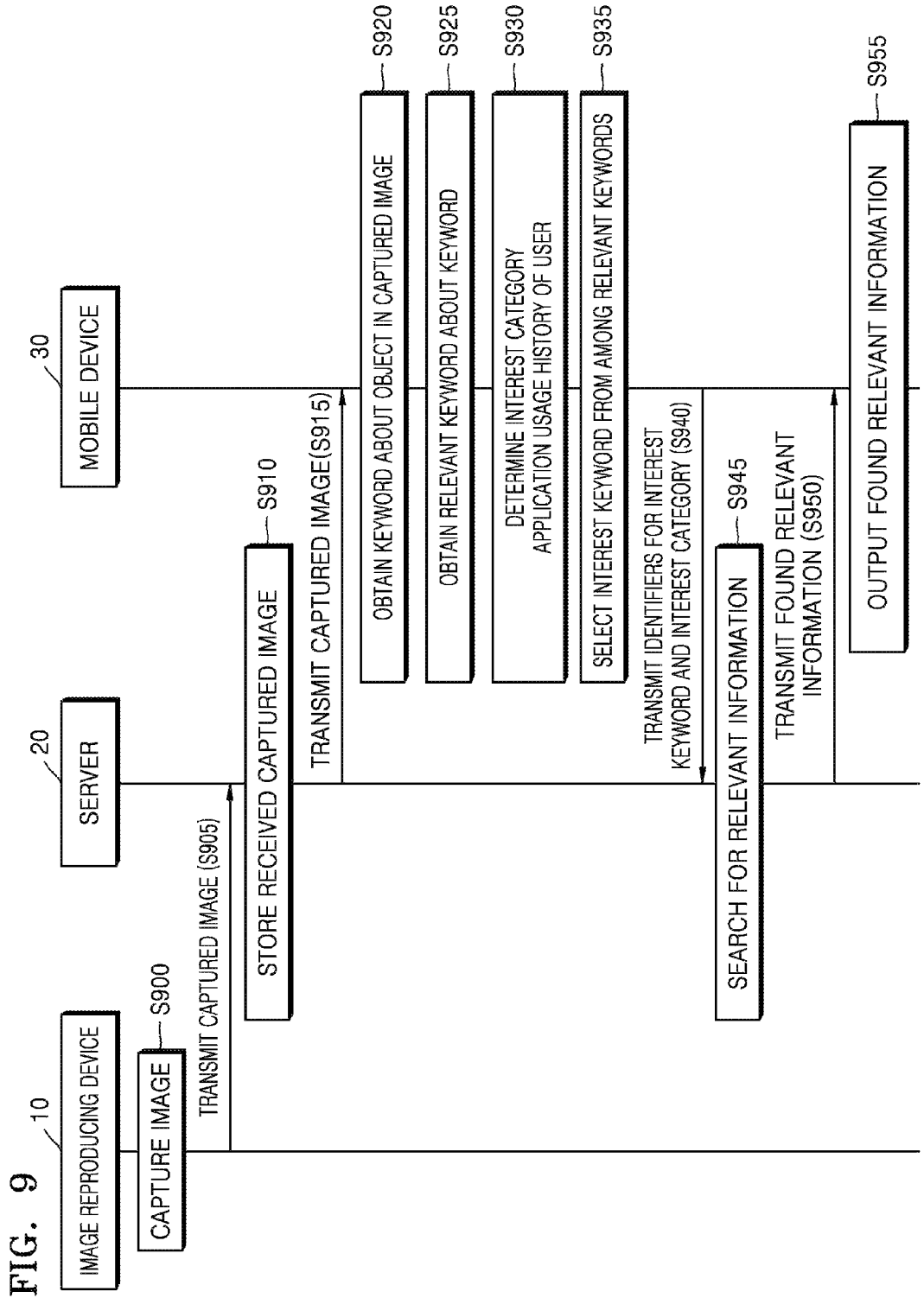
FIG. 9 is a sequence diagram illustrating how to search for the relevant information about the image captured by the image reproducing device according to an exemplary embodiment.

FIG. 9 is a flow chart illustrating a method used by the mobile device to search for the relevant information about the captured image according to an exemplary embodiment.

In operations S900 and S905, the image reproducing device 10 captures an image of content being reproduced and transmits the captured image to the server 20. In operation S910, the server 20 stores the image received from the image reproducing device 10. In operations S900, S905, and S910 may be similar to operations S300, S305, and S310 in FIG. 3 and thus detailed descriptions will not be repeated.

Although the server 20 transmits the image captured by the image reproducing device 10 to the mobile device 30 in operation S915, this is merely an example. The image reproducing device 10 may transmit the captured image directly to the mobile device 30.

In operations S920 and S925, the mobile device 30 may extract an object in the image captured by the image reproducing device 10, and obtain a keyword about the object and a relevant keyword about the keyword.

In some exemplary embodiments, the mobile device 30 may extract an object in the captured image by using an object recognition algorithm. Also, the mobile device 30 may extract an object in the captured image by using meta data on the captured image.

In some exemplary embodiments, the mobile device 30 may obtain a keyword about the object in the captured image by using broadcast information on content corresponding to the captured image.

In some exemplary embodiments, the mobile device 30 may obtain a relevant keyword about the obtained keyword by using broadcast information on content corresponding to the captured image. Also, the mobile device 30 may obtain a relevant keyword about the obtained keyword by using a knowledge graph, semantic similarity, ontology, or the like. The mobile device 30 may also obtain a relevant keyword by using a search server, but is not limited thereto.

Although the mobile device 30 obtains a relevant keyword about an object in the captured image in operations S920 and S925, this is merely an example. The server 20 may obtain the relevant keyword about the object in the captured image, and transmit the relevant keyword to the mobile device 30.

In operation S930, the mobile device 30 may determine a user's interest category based on an application usage history of a user.

In some exemplary embodiments, the mobile device 30 may analyze an application usage history of the mobile device 30 to get information on the most frequently executed application over a predetermined time period, the most frequently executed application when the content corresponding to the captured image is broadcast, the most frequently executed application in a place where the image reproducing device 10 is located, or the like. The mobile device 30 may determine an interest category based on the analysis result.

In operation S935, the mobile device 30 may select an interest keyword included in the interest category from among the obtained relevant keywords.

In some exemplary embodiments, the mobile device 30 may select an interest keyword by using a basic keyword set that is classified according to the identified category. Also, the mobile device 30 may select an interest keyword matched to the identified category by using a matching algorithm in which the obtained relevant keyword matches the identified category, but is not limited thereto.

In operation S940, the mobile device 30 may transmit identifiers for the interest keyword and the interest category to the server 20. Also, the mobile device 30 may transmit the relevant keyword to the server 20.

In operation S945, the server 20 may search for relevant information by using the identifiers for the received interest keyword and interest category. The found relevant information may be transmitted to the mobile device 30 in operation S950.

Although it in operations S940 and 945, the mobile device 30 transmits the identifiers for the interest keyword and the interest category to the server 20, and the server 20 searches for the relevant information, this is merely an example. The mobile device 30 may transmit the identifiers for the interest keyword and the interest category to an external search server, and receive the relevant information from the external search server. The mobile device 30 may also perform the search for the relevant information.

In operation S955, the mobile device 30 may output the received relevant information. A method used by the mobile device 30 to output the received relevant information may be similar to operation S350 in FIG. 3 and thus a detailed description will not be repeated.

Figure 10:
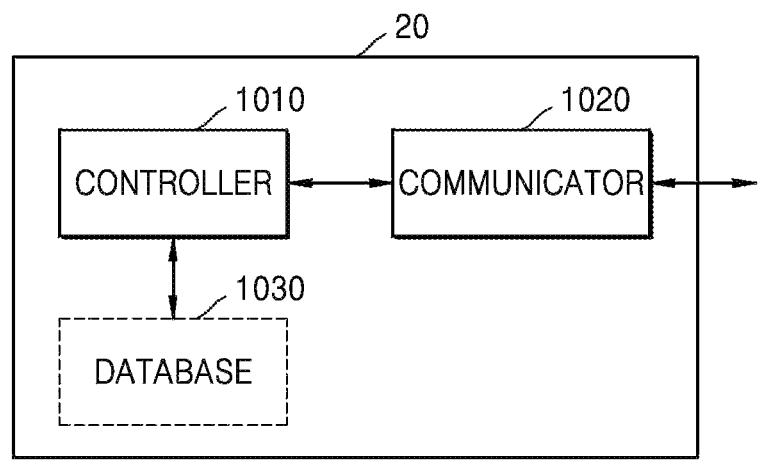
FIG. 10 is a block diagram of a server according to an exemplary embodiment.

FIG. 10 is a block diagram of a server according to an exemplary embodiment of the inventive concept.

As illustrated in FIG. 10, the server 20 may include a controller 1010, a communicator 1020, i.e. a transceiver, and a database 1030. However, the server 20 may include additional or alternative elements than those illustrated in FIG. 10, or not include all the elements illustrated in FIG. 10.

The controller 1010 is configured to control an overall operation of the server 20 and may include, for example, a central processing unit (CPU).

The controller 1010 may receive the image captured by the image reproducing device from the image reproducing device, and store the received image. Also, the controller 1010 may receive the identifier for the content corresponding to the captured image from the image reproducing device.

Also, the controller 1010 may obtain broadcast information on the content corresponding to the captured image from a broadcast provider of the image reproducing device by using the identifier of the content received from the image reproducing device.

The controller 1010 may extract the object in the image captured by the image reproducing device, and obtain the keyword about the extracted object. Also, the controller 1010 may obtain the relevant keyword about the obtained keyword. For example, controller 1010 may obtain the relevant keyword by using broadcast information on the content corresponding to the captured image. Also, the controller 1010 may obtain the relevant keyword about the obtained keyword by using a knowledge graph, semantic similarity, ontology, or the like. In addition, the controller 1010 may obtain the relevant keyword about the obtained keyword from a search server.

The controller 1010 may determine the interest category based on the application usage history of a user received from the mobile device.

The controller 1010 may select for the interest keyword included in the interest category from among the obtained relevant keywords, and obtain multiple the relevant keywords included in the interest keyword.

The controller 1010 may search for the relevant information by using the identifiers for the interest keyword and the interest category. The controller 1010 may search for the relevant information by using a search engine included in the server 20, or use an external search server.

The communicator 1020 is configured to transmit data to and receive data from the image reproducing device, the mobile device, a broadcast provider, and the like through a wired or wireless network.

The communicator 1020 may receive at least one selected from the image captured by the image reproducing device, the meta data corresponding to the captured image, and the identifier for the content corresponding to the captured image.

Also, the communicator 1020 may receive the broadcast information on the content corresponding to the captured image from the broadcast provider.

The communicator 1020 may receive the information on the application usage history of a user in the mobile device from the mobile device.

The communicator 1020 may transmit the relevant information about the image captured by the image reproducing device to the mobile device.

The database 1030 may store the image captured by the image reproducing device. The database 1030 may also store at least one selected from the meta data of the captured image and the broadcast information of the content corresponding to the captured image, and store the relevant keyword, the interest keyword, and the interest category corresponding to the captured image.

The database 1030 may include at least one storage medium, for example a memory of a flash memory type, hard disk type, multimedia card micro type, a card-type memory (e.g., SD or XD memory), random access memory (RAM), static random access memory (SRAM), read only memory (ROM), electrically erasable programmable read-only memory (EEPROM), programmable read-only memory (PROM), a magnetic memory, magnetic disk, optical disk, etc.

Figure 11:
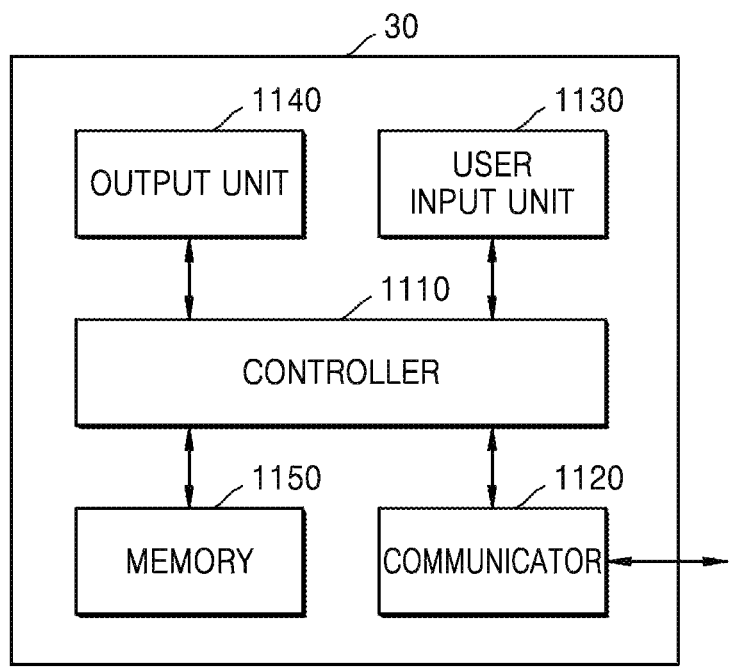
FIG. 11 is a block diagram of the mobile device according to an exemplary embodiment.

FIG. 11 is a block diagram of the mobile device according to an exemplary embodiment.

As illustrated in FIG. 11, the mobile device 30 may include a controller 1110, a communicator 1120, a user input unit 1130, i.e., a user input interface, an output unit 1140, and a memory 1150. However, the mobile device 30 may include alternative or additional elements as those illustrated in FIG. 11, or fewer elements than those illustrated in FIG. 11.

The controller 1110 generally controls an overall operation of the mobile device 30 and may include, for example, a CPU and a graphic processing unit (GPU). For example, the controller 1110 may execute a program stored in the memory 1150 to generally control the communicator 1120, the user input unit 1130, and the output unit 1140.

The controller 1110 may provide the user interface for capturing the image from the images of the content being reproduced in the image reproducing device.

The controller 1110 may obtain the information on the application usage history of a user. Also, the controller 1110 may analyze the information on the application usage history of a user.

The controller 1110 may extract the object in the image captured by the image reproducing device, and obtain the keyword about the extracted object and the relevant keyword about the keyword.

The controller 1110 may determine the user's interest category based on the application usage history. Also, the controller 1110 may select the interest keyword included in the interest category from among the obtained relevant keywords.

The controller 1110 may control the output unit 1140 to output the relevant information about the image captured by the image reproducing device in a screen.

The communicator 1120 may include at least one element that enables the mobile device 30 to communicate with the image reproducing device 10, the server 20, the external search server, and the broadcast provider through a wired or wireless network. For example, the communicator 1120 may include a near field communicator, a mobile communicator, and a broadcast receiver.

The communicator 1120 may receive the image captured by the image reproducing device from the server 20 or the image reproducing device 10. Also, the communicator 1120 may receive the meta data on the captured image.

Also, the communicator 1120 may receive broadcast information on the content corresponding to the image captured by the image reproducing device from the server 20.

The communicator 1120 may transmit the information on the application usage history of a user to the server 20.

The communicator 1120 may receive the relevant information about the image captured by the image reproducing device. Also, the communicator 1120 may receive the relevant keyword about the captured image.

The user input unit 1130 provides an interface with an external device or a person. The user input unit 1130 may include a touch sensitive screen, touch pad, or buttons disposed on the mobile device 30.

Also, the user input unit 1130 may receive a user input for capturing the image of the content being reproduced in the image reproducing device.

The user input unit 1130 may receive a user input requesting an update of the relevant information about the image captured by the image reproducing device.

The output unit 1140 outputs an audio signal, a video signal, or a vibration signal, and may include a display, a sound output unit, e.g., a speaker or an audio jack, and a vibration motor.

Also, the output unit 1140 may output a user interface for capturing the image from images of the content being reproduced in the image reproducing device.

The output unit 1140 may output a captured image list including a plurality of captured images that are captured by at least one image reproducing device.

The output unit 1140 may output the relevant information about the image captured by the image reproducing device.

The memory 1150 may store a usage history of applications run on the mobile device 30.

The memory 1150 may include at least one storage medium, for example, a storage medium of a flash memory type, hard disk type, multimedia card micro type, a card-type memory (e.g., SD or XD memory), random access memory (RAM), static random access memory (SRAM), read only memory (ROM), electrically erasable programmable read-only memory (EEPROM), programmable read-only memory (PROM), a magnetic memory, magnetic disk, optical disk, etc.

A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable medial, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

While one or more exemplary embodiments have been shown and described, it will be understood by one of ordinary skill in the art that various changes in form and details may be made therein without departing from the spirit and scope of the present invention as defined by the following claims. Hence, it will be understood that the exemplary embodiments described above are not limiting of the scope of the invention. For example, each component described in as single element may be executed in a distributed manner, and components described in a distributed manner may also be executed in an integrated form.

It should be understood that the exemplary embodiments described herein should be considered in a descriptive sense only and not limiting. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope as defined by the following claims.

What is claimed is:

1. A method executed by a server to provide a mobile device with relevant information about an object in a captured image received from an image reproducing device, the method comprising:
   receiving, from the image reproducing device, an image captured by the image reproducing device;
   receiving, from the mobile device, information corresponding to an application usage history of the mobile device;
   determining an interest category based on the information corresponding to the application usage history;
   obtaining a plurality of relevant keywords corresponding to an object in the received image captured by the image reproducing device;
   selecting an interest keyword included in the interest category from among the plurality of obtained relevant keywords; and
   transmitting to the mobile device the relevant information about the object in the captured image based on the selected interest keyword.

2. The method of claim 1, wherein the information corresponding to the application usage history comprises use information about at least one selected from among a name of an application executed on the mobile device, information about an operation performed by the application, and information about when and where the application was executed.

3. The method of claim 1, further comprising:
   searching for the relevant information using the selected interest keyword.

4. The method of claim 1, further comprising searching for the relevant information using an identifier for the interest keyword and the interest category.

5. The method of claim 1, further comprising:
   receiving, from the mobile device, an update request to update the relevant information;
   receiving, from the mobile device information, updated application usage history; and updating the relevant information about the object in the captured image based on the updated application usage history.

6. A non-transitory computer readable storage medium having recorded thereon a program for running the method of claim 1 on a computer.

7. A method executed by a server to provide a mobile device with relevant information about an object in a captured image received from an image reproducing device, the method comprising:
  receiving, from the image reproducing device, an image captured by the image reproducing device;
  receiving, from the mobile device, information corresponding to an application usage history of the mobile device;
  searching, based on the application usage history, for the relevant information about the object in the captured image; and
  transmitting to the mobile device the relevant information found based on the searching,
  wherein the captured image is an image captured from content being reproduced by the image reproducing device, and
  wherein the method further comprises:
    receiving a content identifier from the image reproducing device;
    obtaining broadcast information corresponding to the content from a broadcast server that provides the content based on the content identifier; and
    transmitting the obtained broadcast information to the image reproducing device or the mobile device.

8. A method executed in a mobile device to output relevant information about an object in an image captured by an image reproducing device, the method comprising:
  receiving a user input;
  transmitting, to the image reproducing device, in response to the user input, an image capture request for capturing an image from content being reproduced by the image reproducing device;
  transmitting, to a server, information corresponding to an application usage history of the mobile device;
  receiving, from the server, relevant information about the object in the image captured by the image reproducing device according to the image capture request; and
  outputting the received relevant information,
  wherein the server obtains relevant information by:
    determining an interest category based on the information corresponding to the application usage history;
    obtaining a plurality of relevant keywords corresponding to the object in the image captured by the image reproducing device;
    selecting an interest keyword included in the interest category from among the plurality of obtained relevant keywords; and
    searching, based on the selected interest keyword, for the relevant information about the object in the captured image.

9. The method of claim 8, wherein the information corresponding to the application usage history comprises use information about at least one selected from among a name of an application executed on the mobile device, information about an operation performed by the application, and information about when and where the application was executed.

10. The method of claim 8, further comprising:
  transmitting, to the server, a relevant information update request for updated relevant information;
  transmitting, to the server, information corresponding to an updated application usage history of the user; and
  receiving, from the server, the updated relevant information updated based on the updated application usage history.

11. A server comprising:
  a transceiver configured to communicate with an image reproducing device and a mobile device; and
  a controller configured to control the transceiver to receive an image captured by the image reproducing device from the image reproducing device, to control the transceiver to receive information corresponding to an application usage history of the mobile device from the mobile device, to determine an interest category based on the information corresponding to the application usage history, to search for relevant information about an object in the captured image based on the determined interest category, and to control the transceiver to transmit the relevant information to the mobile device,
  wherein the controller is further configured to obtain a plurality of relevant keywords corresponding to the object in the captured image, and to select an interest keyword included in the interest category from among the plurality of obtained relevant keywords.

12. The server of claim 11, wherein the information corresponding to the application usage history comprises use information corresponding to at least one selected from among a name of the application executed on the mobile device, an operation performed by the application, and information about when and where the application was executed.

13. The server of claim 11, wherein the controller is further configured to search for the relevant information using the selected interest keyword.

14. The server of claim 11, wherein the controller is further configured to search for the relevant information based on the interest keyword and the interest category.

15. The server of claim 11, wherein the controller is further configured to control the transceiver to receive, from the mobile device, an update request to update the relevant information, to control the transceiver to receive, from the mobile device, information on an updated application usage history, and to update the relevant information based on the updated application usage history.

16. A server comprising:
  a transceiver configured to communicate with an image reproducing device and a mobile device; and
  a controller configured to control the transceiver to receive an image captured by the image reproducing device from the image reproducing device, to control the transceiver to receive information corresponding to an application usage history of the mobile device from the mobile device, to search for relevant information about an object in the captured image based on the application usage history, and to control the transceiver to transmit the relevant information to the mobile device,
  wherein the image captured by the image reproducing device is an image captured from content being reproduced in the image reproducing device, and
  wherein the controller is further configured to control the transceiver to receive a content identifier from the image reproducing device, to control the transceiver to obtain, from a broadcasting server that provides the content, broadcast information corresponding to the content based on the identifier for the content, and to control the transceiver to transmit, to the image reproducing device or the mobile device, the obtained broadcast information.

17. A mobile device comprising:
an input interface configured to receive a user input;
a transceiver; and
a controller configured to control the transceiver to transmit, to an image reproducing device, an image capture request for capturing an image from content being reproduced by the image reproducing device in response to the user input, to control the transceiver to transmit, to a server, information corresponding to an application usage history, and to control the transceiver to receive, from the server, relevant information about an object in the image captured by the image reproducing device according to the image capture request,
wherein the server is configured to obtain the relevant information by:
   determining an interest category based on the information corresponding to the application usage history;
   obtaining a plurality of relevant keywords corresponding to the object in the captured image;
   selecting an interest keyword included in the interest category from among the plurality of obtained relevant keywords; and
   searching, based on the selected interest keyword, for the relevant information about the object in the captured image.

18. A mobile device comprising:
a transceiver; and
a controller configured to control the transceiver to transmit, to an image reproducing device, an image capture request to capture an image of content reproduced by the image reproducing device, to determine an interest category based on application usage history of the mobile device, to search for relevant information corresponding to the image captured according to the image capture request based on the determined interest category, and to output the relevant information,
wherein the controller is further configured to extract an object from the captured image, to obtain a plurality of relevant keywords corresponding to the object in the captured image, and to select an interest keyword included in the interest category from among the plurality of obtained relevant keywords.

19. The mobile device of claim 18, wherein the controller is further configured to search for the relevant information corresponding to the extracted object based on the selected interest keyword.

* * * * *